(12) United States Patent
Monzen et al.

(10) Patent No.: US 8,162,654 B2
(45) Date of Patent: Apr. 24, 2012

(54) APPARATUS FOR FEEDING RESIN

(75) Inventors: Hideto Monzen, Kanagawa (JP);
Hiroyuki Hashimoto, Kanagawa (JP);
Hotaka Fukabori, Kanagawa (JP);
Takuya Fujikawa, Kanagawa (JP);
Hiroshi Hayashi, Saitamia (JP); Tsuneo Imatani, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 12/670,411

(22) PCT Filed: Sep. 3, 2008

(86) PCT No.: PCT/JP2008/065871

§ 371 (c)(1),
(2), (4) Date: Jan. 25, 2010

(87) PCT Pub. No.: WO2009/034892

PCT Pub. Date: Mar. 19, 2009

(65) Prior Publication Data

US 2010/0209727 A1    Aug. 19, 2010

(30) Foreign Application Priority Data

Sep. 14, 2007  (JP) ................. 2007-238926

(51) Int. Cl.
*B29B 11/02* (2006.01)
(52) U.S. Cl. .................... 425/510; 264/150; 428/542.8
(58) Field of Classification Search .............. 425/510
See application file for complete search history.

(56) References Cited

U.S. PATENT DOCUMENTS

2007/0196531 A1    8/2007  Parrinello et al.

FOREIGN PATENT DOCUMENTS

| | | |
|---|---|---|
| JP | 2000-108127 | 4/2000 |
| JP | 2005-059240 | 3/2005 |
| JP | 2005-343110 | 12/2005 |
| JP | 2007-216531 | 8/2007 |
| WO | 2005/102640 | 11/2005 |
| WO | 2006/109108 | 10/2006 |
| WO | 2007/094518 | 8/2007 |

OTHER PUBLICATIONS

U.S. Appl. No. 12/670,414 to Hideto Monzen et al., filed Jan. 25, 2010.
International Search Report dated Oct. 14, 2008 that issued with respect to PCT/JP2008/065871.
International Search Report dated Oct. 14, 2008 that issued with respect to PCT/JP2008/065872.
European Search Report dated Apr. 14, 2011.

*Primary Examiner* — Philip Tucker
*Assistant Examiner* — Alison Hindenlang
(74) *Attorney, Agent, or Firm* — Greenblum & Bernstein, P.L.C.

(57) ABSTRACT

Apparatus for feeding molten resin includes a holding unit that moves on a track and at least a pair of holders capable of holding and releasing the molten resin accompanying the opening and closing of the holding unit. A base portion is utilized for supporting the holders so as to be opened and closed and for holding the molten resin together with the holders. The molten resin discharged from an extrusion-forming machine and cut by a cutter is held by the holding unit, and it fed from the holding unit to a female mold of a compression-0molding machine. At the time of cutting the molten resin, a cutter mark is formed by the cutter on a cut surface of the molten resin.

5 Claims, 9 Drawing Sheets

A

B

C

APPARATUS FOR FEEDING RESIN

TECHNICAL FIELD

This invention relates to an apparatus for feeding resin in which a molten resin discharged from an extruder is held by a holding unit and is fed from the holding unit to a metal mold in a compression-molding machine.

BACKGROUND ART

Synthetic resin containers made from a synthetic resin such as polyester or polyethylene terephthalate (PET) have been widely put into practical use as containers for beverages. A preform that is to be formed into a synthetic resin container by blow-forming can be integrally formed by compression-molding by using a compression-molding machine.

In executing the compression-molding, the synthetic resin in a molten state is extruded through an opening of an extrusion nozzle and is fed to the compression-molding machine by a resin feeder.

FIG. 8A is a plan view illustrating a state where a molten resin 107 is held by a holding unit of a conventional apparatus for feeding resin, FIG. 8B is a plan view illustrating a state where the holding unit is opened, and FIG. 8C is a side view of when FIG. 8A is viewed from a direction of line X-X.

The holding unit 101 is held by rotary means which is not shown so as to move along a rotary track. The holding unit 101 includes a base portion 102 and a pair of holders 103. A semi-cylindrical recessed holding portion 104 is formed in the base portion 102. A cutter 105 is formed at an upper part of the base portion 102, the blade tip thereof protruding upward and aslant in a direction in which it proceeds, and the blade extending in parallel with the radial direction of rotation of the holding unit 101. The pair of holders 103 is rotatably supported by the base portion 102 so as to be opened and closed.

While moving on the rotary track, the holding unit 101 opens the holders 103 as shown in FIG. 8B on the upstream of the die head of the extruder (see FIG. 2 of the embodiment), cuts the molten resin (drop) 107 discharged from the die head by the cutter 105, closes the holders 103 as shown in FIG. 8A to hold the molten resin 107, is conveyed to just over the metal mold of the compression-molding machine, and feeds the molten resin 107 to a female mold of the metal mold.

The following patent document 1 discloses an apparatus for feeding molten resin in which a synthetic resin cut away from an extrusion opening of a die head is held by a holder, and the holder is opened when it is conveyed to just over a female mold of a compression-molding machine to thereby feed the molten resin into the female mold.

Patent document 1: JP-A-2000-108127
Patent document 2: JP-A-2005-059240

DISCLOSURE OF THE INVENTION

Problems to be Solved by the Invention

FIGS. 9A and 9B illustrate a shape of a molten resin discharged from an end of the nozzle of the die head after it is cut by the cutter 105, wherein FIG. 9A shows a shape of the molten resin 107 as viewed from a direction at right angles with the direction of cutting by the cutter 105 (direction in which the molten resin 107 or the holding unit 101 moves) and FIG. 9B shows the molten resin 107 as viewed from the front in the direction in which the holding unit 101 moves.

When the molten resin 107 is cut by the cutter 105, the upper end of the molten resin 107 to which the cutter 105 comes in contact, first, is deformed into a tilted surface 107a that extends rearward being tilted. A cutter mark 107b that is a vertex portion is formed at an end portion of the tilted surface 107a, and the rear side of the cutter mark (front side in the direction in which the holding unit 101 moves) is deformed into a downwardly curved surface 107c nearly toward the rear side. The whole upper end of the molten resin 107 assumes the form of a mountain having, as a vertex, the cutter mark 107b traversing the molten resin 107 in the radial direction of rotation of the holding unit 101 due to the shape and movement of the cutter 105.

Referring to FIG. 9B, the cutter mark 107b is linearly formed having a length nearly equal to the diameter of the molten resin 107, and forms angular shapes 107d at both ends of the cutter mark 107b. Thereafter, the molten resin 107 is fed into the female mold of the compression-molding machine and is compression-formed together with the male mold.

If compression-formed with the cutter mark 107b being formed or both ends of the cutter mark 107b forming angular shapes 107d, then angular traces rise up to the body portion of the preform along the female mold or the male mold of the compression-molding mold and are expressed as longitudinal traces in the direction of height of the preform. FIG. 10 shows the longitudinal traces of the preform. The longitudinal traces 111 appear as longitudinal lines from the body portion 110a of the preform 110 down to the lower semispherical portion 110b. In the semispherical portion 110b of the preform, the longitudinal traces disappear or remain as a single trace or remain being branched into two as shown in FIG. 10. The longitudinal traces 111 are formed in the inner surface of the preform but, if viewed from the outer side of the preform, appear to be formed in the front surface side of the preform due to the refraction of light.

In the bottom portion (semispherical portion) of the preform, the longitudinal traces 111 are little stretched even after the preform is blow-formed into a container and, besides, stay in the bottom portion which appears little; i.e., the traces appear little. At the time of blow-forming the bottom portion of the preform, further, the press working is, as required, effected by using a drawing rod (stretch rod) or a support pin (press rod) so that the traces become less conspicuous. After the preform is blow-formed into a container, however, the traces in the body portion are further spread leaving conspicuous longitudinal traces (defective appearance) on the container body portion that has a decreased thickness due to drawing.

According to the patent document 2, on the other hand, the holding unit 101 of FIG. 8 is provided with a holding wall having a recessed portion instead of the holders 103. Upon holding the molten resin by the holding wall, the upper part and the lower part of the molten resin 107 away from the recessed portion are depressed causing the diameter (length) of the cutter mark 107b to be decreased. During the compression-molding, therefore, the ends 107d of the cutter mark (FIG. 9) do not come in contact with the surface of the female mold (surface of inner hole 54 of cavity mold 52 in FIG. 5), and the longitudinal traces are effectively prevented.

Even with the apparatus of the patent document 2, however, the ends 107d of the cutter mark are very rarely positioned at portions of an outer diameter of the side wall of the male mold, and the longitudinal traces rise along the side wall of the male mold and are often expressed on the side wall on the inner surface side of the preform.

The present invention was accomplished in view of the above circumstances and has an object of providing an apparatus for feeding resin capable of extinguishing angular traces formed at both end portions of the cutter mark or of preventing the angular traces from extending up to the side wall of the body portion of the preform at the time of forming a preform.

Means for Solving the Problems

To achieve the above object, the apparatus for feeding resin of the present invention comprises a holding unit that moves on a track, at least a pair of holders capable of holding and releasing the molten resin accompanying the opening and closing of the holding unit, and a base portion for supporting the holders so as to be opened and closed and for holding the molten resin together with the holders;

wherein the molten resin discharged from an extrusion-forming machine and cut by a cutter is held by the holding unit, and is fed from the holding unit to a female mold of the compression-molding machine;

and wherein at the time of cutting the molten resin, a cutter mark is formed by the cutter on the cut surface of the molten resin; and a protruded portion is formed on the inner circumferential surface of at least one holder of the pair of holders to deform the end portions of the cutter mark toward the inside of the cutter mark at the time when the molten resin is held by the holding unit.

In the apparatus for feeding molten resin, the pair of holders can be opened and closed in the direction of cutter mark of the molten resin.

In the apparatus for feeding molten resin, the protruded portion of one holder of the pair of holders each forming the protruded portion can be protruded toward the inside of the cutter mark more than the protruded portion of the other holder.

In the apparatus for feeding molten resin, the protruded portion is formed to be larger than the length of a difference in the radius between the radius of the inner hole of the female mold and the radius of the distal end portion of the male mold of the compression-molding machine, and the cutter mark of the molten resin can be deformed toward the inside of the cutter mark.

At the time of holding the molten resin by the holding unit, a distance between at least one protruded portion for deforming the end portions of the cutter mark toward the inside of the cutter mark and the other protruded portion or the portion on the inner circumferential surface of the holder holding the molten resin, can be set to be narrower than the diameter of the distal end portion of the male mold of the compression-molding machine.

The holding unit moves along a rotary track, the cutter is mounted on the holding unit, the blade of the cutter is arranged in parallel with the radial direction of the rotary track of the holding unit, and wherein of the pair of holders that opens and closes in the direction of cutter mark of the molten resin, one of the pair of holders is arranged on the outer side of the holding unit in the radial direction of rotation thereof, and the other one of the pair of holders is arranged on the inner side in the radial direction of rotation thereof.

The invention is further concerned to a method of compression-molding a cylindrical article with bottom by cutting a molten resin of a synthetic resin extruded from an extruder by using a cutter, feeding the molten resin into a female mold of a compression-molding machine equipped with a male mold having a pole-like body portion and the female mold with a cutter mark formed by the cutting by the cutter being faced toward the opening side of the female mold, and compression-molding the cylindrical article with bottom by the cooperation of the male mold and the female mold, wherein the molten resin is depressed prior to being compression-formed so that a maximum width of the cutter mark becomes narrower than a minimum width of the pole-like body portion.

The pole-like body portion of the male mold is a cylindrical body portion, the synthetic resin is a polyester, and the cylindrical article with bottom is a preform of a blow-formed container.

The invention is further concerned to a cylindrical preform with bottom for being blow-formed into a container, wherein striped traces are present in the cylindrical preform with bottom on the inner surface side thereof in the bottom portion only of the preform.

Effect of the Invention

According to the apparatus for feeding molten resin of the present invention, a linear cutter mark is formed on the cut surface of the molten resin in a direction at right angles with the direction in which the molten resin is cut by the cutter, and protruded portions are formed on the inner circumferential surfaces of the holders to deform the end portions of the cutter mark toward the inside of the cutter mark at the time when the molten resin is held by the pair of holders, preventing the angular traces of the cutter mark from rising up to the body portion of the preform. This prevents the occurrence of longitudinal traces that extend on the side surface of the bottle and helps improve the productivity of preforms and containers.

Figure 1:
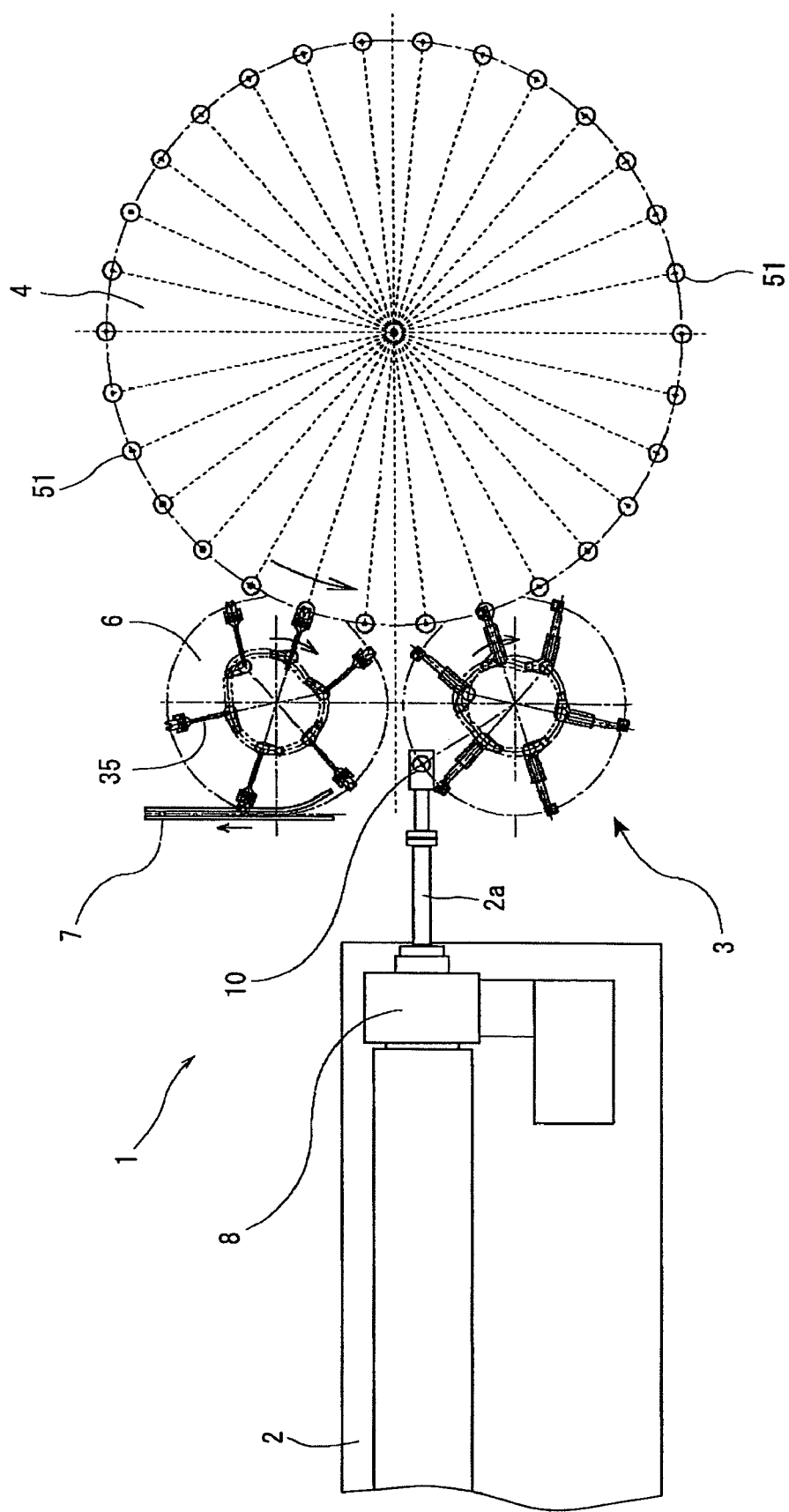
FIG. 1 is a plan view schematically illustrating a whole compression-molding apparatus equipped with an apparatus for feeding resin according to an embodiment of the invention.

DESCRIPTION OF REFERENCE NUMERALS 1 compression-molding apparatus
2 extruder
3 apparatus for feeding molten resin
4 compression-molding machine
17 holding unit
21 base portion
22, 23 holders
28 cutter
29 cutter mark
32, 33 protruded portions
32a, 33a tilted surfaces
52 cavity mold
55 core

BEST MODE FOR CARRYING OUT THE INVENTION

An apparatus for feeding resin according to an embodiment of the invention will now be described with reference to the drawings.

FIG. 1 is a plan view schematically illustrating a compression-molding apparatus for forming a preformed article called preform such as of PET bottle or the like bottle.

The compression-molding apparatus includes an extruder 2, a resin feeder 3, a compression-molding machine 4, an outlet wheel 6 and a take-out conveyer 7.

The extruder 2 has nearly a cylindrical outer shape, heats, melts and kneads a synthetic resin material such as PET, and conveys the molten resin to a gear pump 8. The gear pump 8 ejects the molten resin maintaining stability relying upon the mesh of gears. An ejection port of the gear pump 8 is connected to a downwardly oriented die head 10 via a conduit 2a. The die head 10 has a cylindrical shape in cross section, and the synthetic resin in a molten state is continuously extruded down from the die head 10 in nearly a cylindrical shape.

Figure 2:
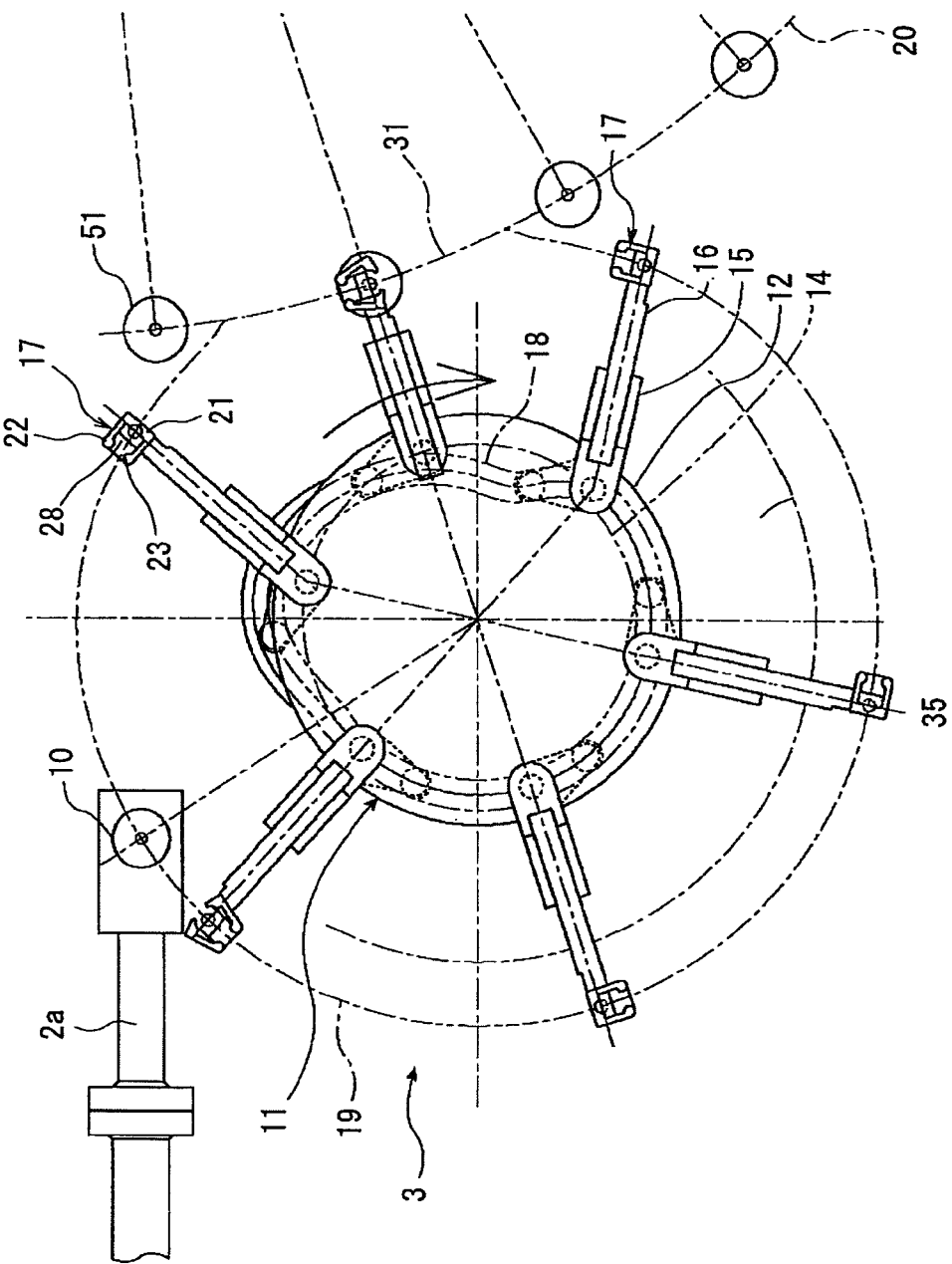
FIG. 2 is a plan view illustrating the periphery of the apparatus for feeding resin of FIG. 1 on an enlarged scale.

FIG. 2 is a plan view of the apparatus for feeding resin according the embodiment of the invention on an enlarged scale.

The apparatus 3 for feeding resin is provided with a cutter wheel 11. The cutter wheel 11 includes a rotary plate 12, a swing cam 14, swing units 15, expansion units 16 and holding units 17. The rotary plate 12 is a disk-like member and has swing units 15 in a number of six in the drawing along the circumferential edge maintaining an equal angular distance so as to turn together with the rotary plate 12. The rotary plate 12 has a motor (not shown) as drive means and rotates in the clockwise direction as viewed from the upper side.

The swing unit 15 has a cam follower at the lower part thereof. When the rotary plate 12 rotates, the cam follower moves along a groove 18 formed in the swing cam 14 and swings.

The expansion unit 16 is a rod-like member extending nearly in the radial direction of the rotary plate 12, and has a holding unit 17 at the distal end portion on the outer circumferential side thereof. The expansion unit 16 is provided in an upper part of the swing unit 15 via a linear bearing or the like so as to reciprocally move in the lengthwise direction of the swing unit 15. The expansion unit 16 reciprocally moves nearly in the radial direction of the rotary plate 12 due, for example, to an air cylinder, a cam, a spring or a motor or a combination thereof (not shown).

Due to the swinging motion of the swing unit 15 and the reciprocal motion of the expansion unit 16, the holding unit 17 turns along a track 19 at the time of operation, and moves along a rotary track 20 of a metal mold 51 before and after handing the molten resin over to the metal mold 51 of the compression-molding machine 4. Even when operated at a high speed, therefore, the molten resin can be reliably handed over.

Figure 3:
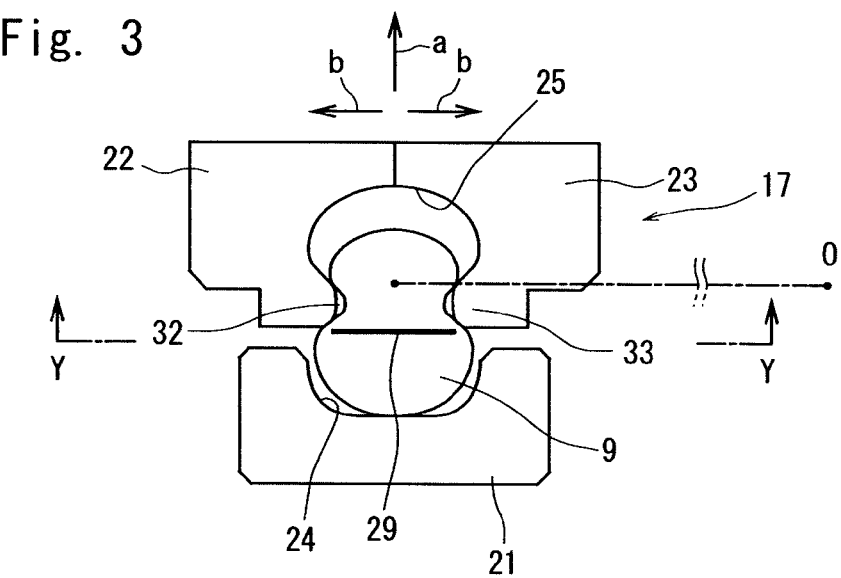
FIG. 3 is a plan view illustrating a state where protruded portions of the holders arranged in the apparatus for feeding resin of FIG. 2 are depressing the molten resin (for easy comprehension, a cutter 28 shown in FIG. 2 is omitted here).
Figure 4:
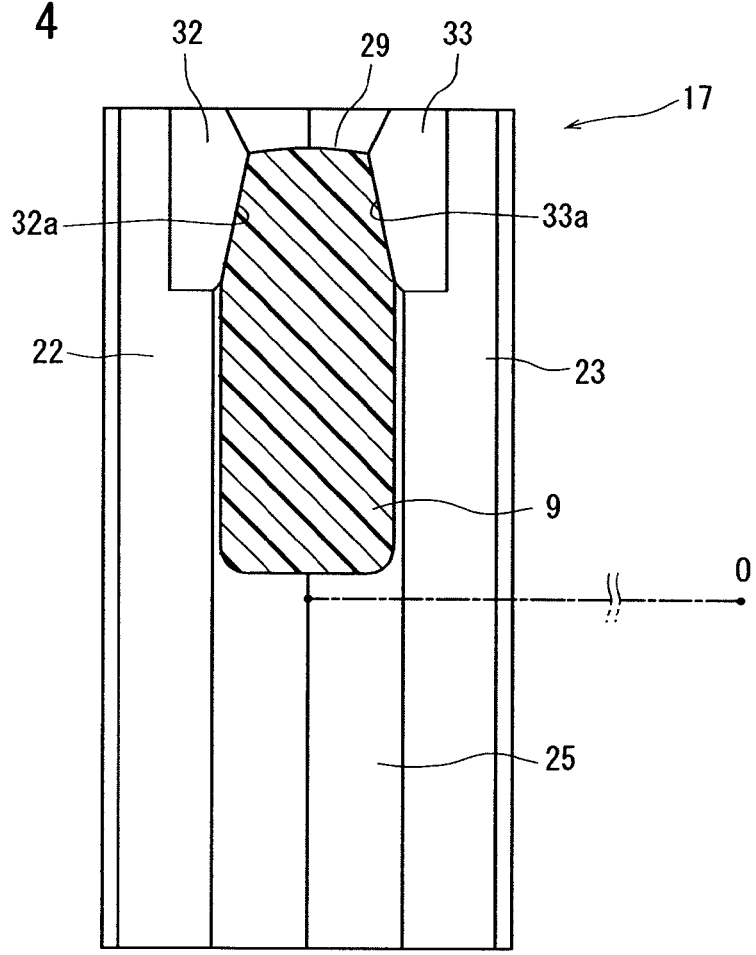
FIG. 4 is a sectional view along Y-Y in FIG. 3 that illustrates the state where the protruded portions of the holders arranged in the apparatus for feeding resin of FIG. 2 are depressing the molten resin (for easy comprehension, a cutter 28 shown in FIG. 2 is omitted here).

FIGS. 3 and 4 are schematic enlarged views of major portions for illustrating the structure of the holding unit according to the embodiment of the invention.

The holding unit 17 includes a base portion 21 and a pair of holders 22 and 23. The base portion 21 has a recessed holding portion 24 of a semi-circular shape or a nearly semi-elliptic shape formed therein in the up-and-down direction. The pair of holders 22 and 23 are rotatably attached to rotary shafts (not shown) provided in the base portion 21, and can be opened and closed by such means as cam mechanism or actuator.

When in a state of being closed, the holders 22 and 23 are forming the recessed holding portion 25 together with the above recessed holding portion 24 for holding the molten resin.

In a state of the plan view shown in FIG. 3, the holding unit 17 rotates in the direction of an arrow a, one holder 22 being arranged on the outer side of the radius of rotation and the other holder 23 being arranged on the inner side of the radius of rotation. The holders 22 and 23 can be opened and closed in a direction nearly at right angles with the direction of rotation as indicated by arrows b. A rotary shaft O of the rotary plate 12 for turning the holding unit 17 is positioned on the right side of the holding unit 17 in FIGS. 3 and 4.

A cutter 28 (see FIG. 2) is provided at an upper part of the base portion 21 in a manner that the blade thereof is arranged in parallel with the radial direction of rotation of the holding unit 17 and the rotary plate 12. When the molten resin is cut by the cutter 28, a cutter mark 29 is formed at an upper end of the molten resin extending in the radial direction of the rotary plate 12. When the blade of the cutter 28 is arranged being tilted relative to the radial direction of rotation of the holding unit 17, the cutter mark 29, too, is formed being tilted relative to the radial direction of rotation. When the blade of the cutter 28 is not straight but is formed in an arcuate shape or a curved shape, the cutter mark 29, too, is formed in an arcuate shape, a curved shape or the like shape to resemble the shape of the blade of the cutter 28.

A protruded portion 32 is formed on an end of the one holder 22 on the side of the recessed holding portion 25 protruding toward the side of the other holder 23, and a protruding portion 33 is formed on an end of the other holder 23 on the side of the recessed holding portion 24 protruding toward the side of the one holder 22. Besides, the positions where the protruded portions 32 and 33 are formed are located at an upper end portion of the molten resin when the molten resin is held by the holders 22 and 23. Further, the one protruded portion 32 is at a position corresponding to the one end side of the cutter mark 29 formed on the molten resin. The protruded portion 32 is so protruded that the cutter mark 29 at the one end side is deformed toward the inside of the cutter mark 29 (toward the center axis of the molten resin). The other protruded portion 33 is at a position corresponding to the other end side of the cutter mark 29. The protruded portion 33 is so protruded that the cutter mark 29 at the other end side is deformed toward the inside of the cutter mark 29. That is, the protruded portions 32 and 33 are formed on the inner circumferential surfaces of the holders 22 and 23 in a manner that both end portions of the cutter mark 29 are deformed toward the inside.

Concretely, as shown in FIGS. 3 and 4, the protruded portions 32 and 33 have surfaces on the side of the base portion 21 that are protruded toward the base portion 21, so that the length of the cutter mark 29 is decreased from both ends of the cutter mark 29 by a nearly equal width. The surfaces of the protruded portions 32 and 33 on the side of the recessed holding portion 25 are forming tilted surfaces 32a and 33a extending upward in directions in which the recessed holding portion 25 is narrowed.

In this holding unit 17, the holders 22 and 23 are opened on the upstream of the die head 10, and are closed right after having passed over the die head 10. Therefore, the molten resin 9 contained in the recessed holding portions 24 and 25 can be held as it is cut by the cutter 28. The holding unit 17 conveys the molten resin 9 that is cut and held to the compression-molding machine 4 in a state where the holders 22 and 23 are closed.

FIG. 5A illustrates a state where the holding unit 17 is conveyed to just over the cavity mold 52.

Figure 5:
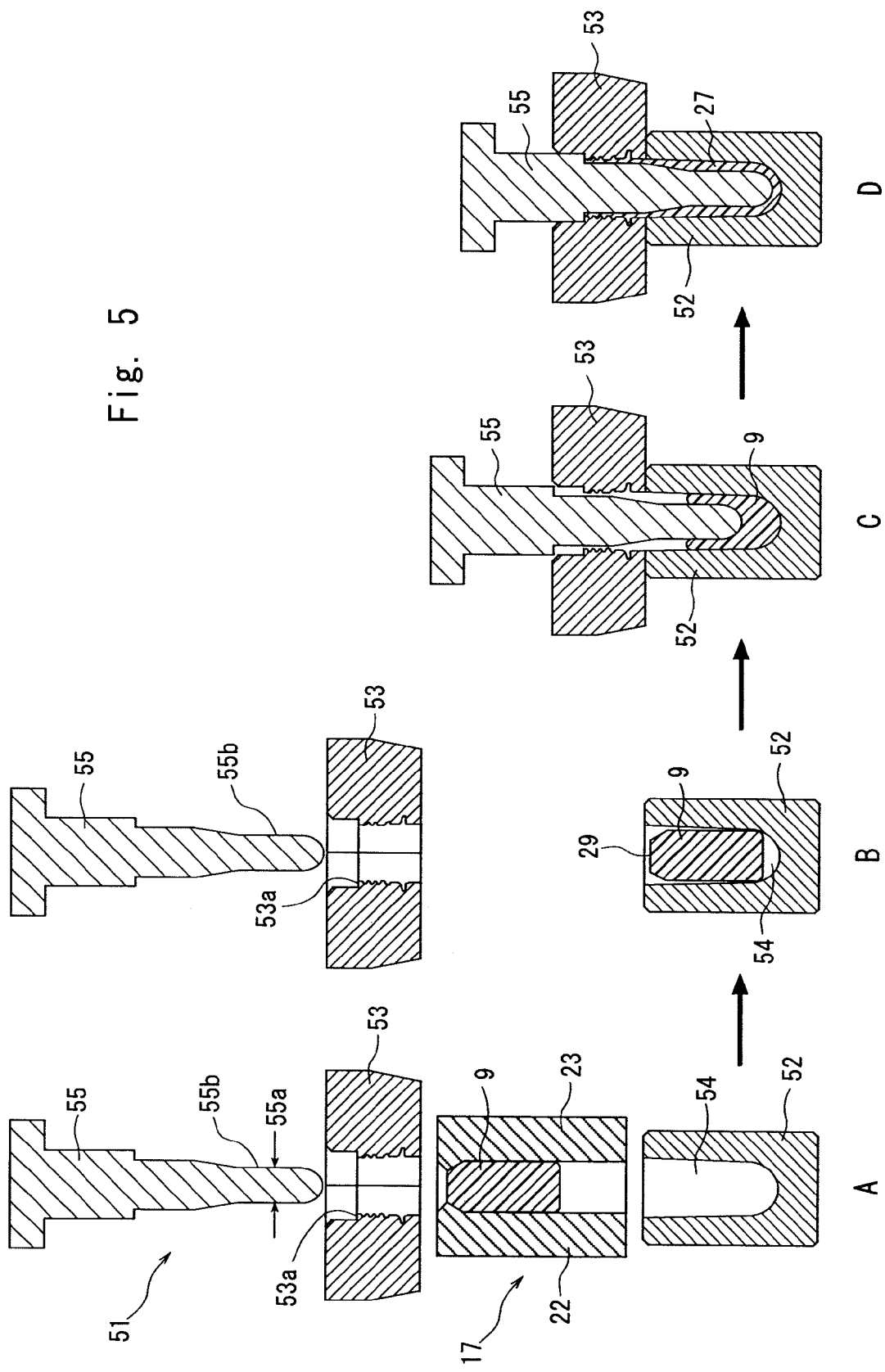
FIG. 5 is a view illustrating steps of compressing a preform in the compression-molding machine shown in FIG. 1, wherein A is a sectional view illustrating a state of just before a molten resin is fed to a cavity mold from a holding unit, B is a sectional view illustrating a state where the molten resin is fed into the cavity mold, C is a sectional view illustrating a state where neck halves are coupled onto the cavity mold, and a core is inserted in a through hole and in an inner hole thereof, and D is a sectional view illustrating a state where the molten resin is compressed to form a preform (state where the compression is nearly completed).

The compression-molding machine 4 is provided to so rotate that a plurality of cavity molds 52 move on a circular track consecutively. The cavity mold 52 is opened at an upper part thereof, and neck halves 53 that serve as an upper mold are provided so as to move up and down relative to the cavity mold 52 as shown in FIG. 5.

At a position where the molten resin 9 is handed over as shown in FIG. 5A, the holding unit 17 is arranged between the neck halves 53 and the cavity mold 52 so that, upon opening the holders 22 and 23, the molten resin 9 can be fed into the inner hole 54 of the cavity mold 52. Referring to FIG. 5B, after the molten resin 9 is fed to the cavity mold 52, the holding unit 17 separates away from the rotary track 20 of the compression-molding machine 4 (see FIG. 2).

The neck halves 53 are formed by a pair of right and left molds that open and close in a horizontal direction, and a core 55 that moves up and down is arranged on the upper side of the cavity mold 52. The core 55 is pushed into a through hole 53a in the neck halves 53 and in the inner hole 54 in the cavity mold 52 so as to compression-form the molten resin 9 and to form a preform.

Referring to FIG. 1, an outlet wheel 6 is disposed on the downstream of the compression-molding machine 4 to take out the preforms. The outlet wheel 6 has a take-out conveyer for conveying the preforms to a next step.

Next, described below is the action of the apparatus for feeding resin according to the embodiment of the invention.

The extruder 2 heats, melts and kneads a synthetic resin material such as polyethylene terephthalate, and conveys the molten resin 9 to the gear pump 8. In order to stably feed the molten resin 9, the gear pump 8 is so constituted as to eject the molten resin 9 by the mesh of gears. The gear pump 8 conveys the molten resin to the downwardly oriented die head 10 shown in FIG. 2 via the conduit 2a. The die head 10 continuously and downwardly extrudes the molten resin 9 formed in a nearly cylindrical shape through an extrusion port formed in the lower end portion thereof.

The extruded molten resin 9 is cut by the cutter 28 and is separated away from the extrusion port. The separated molten resin 9 has the cutter mark 29 formed at the upper end thereof in the radial direction of the rotary plate 12. At a moment when the molten resin 9 is separated, the holders 22 and 23 of the holding unit 17 are closed to hold the molten resin 9. At this moment, the protruded portions 32 and 33 formed on the holders 22 and 23 push the corner portions positioned at both end portions of the cutter mark 29 so as to be deformed toward the inside of the cutter mark 29. The molten resin 9 held by the holding unit 17 with the holders 22 and 23 being closed is moved to a position over the cavity mold 52 of the compression-molding machine 4.

Referring to FIG. 2, the holding unit 17 moves onto the same track 31 as that of the cavity mold 52 of the compression-molding machine 4. Here, as shown in FIG. 5A, the holding unit 17 enters into between the cavity mold 52 and the neck halves 53. The neck halves 53 are arranged over the holding unit 17, and the cavity mold 52 is arranged under the holding unit 17. When their tracks have moved onto the same track 31, the holders 22 and 23 of the holding unit 17 are opened. Next, the molten resin 9 is fed from the holding unit 17 into the inner hole 54 of the cavity mold 52. Thereafter, as shown in FIG. 5B, the holding unit 17 separates away from the track of the cavity mold 52.

Figure 6:
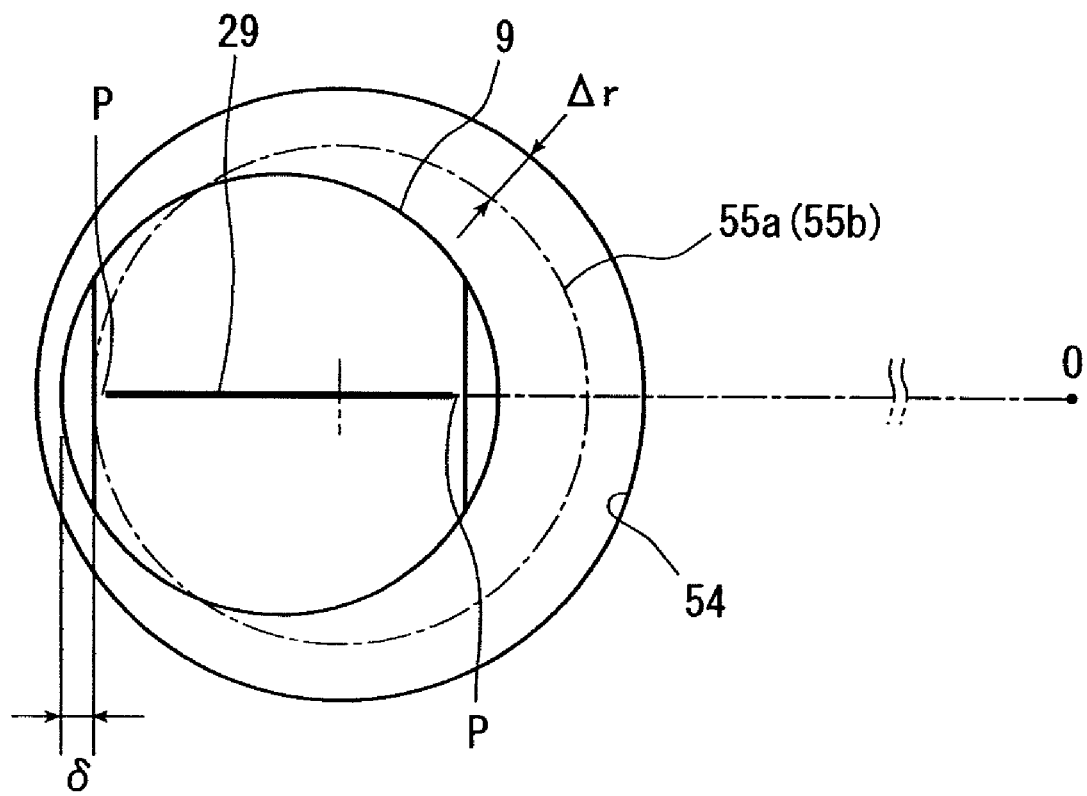
FIG. 6 is a plan view illustrating a positional relationship among the cavity mold and the core in the compression-molding machine shown in FIG. 1, and the cutting line after deformed of the molten resin that is cut.

FIG. 6 shows the inner hole 54 in the cavity mold 52. A dot-dash chain line 55a in the inner hole 54 represents an outer circumferential portion 55b of a cylindrical portion of the core 55 on the distal end side thereof shown in FIG. 5A. At the time of compression-molding the molten resin 9, the core 55 having a side body portion of nearly a cylindrical shape is disposed on a circle in concentric with the inner hole 54 and is arranged at the center of the inner hole 54.

When the molten resin 9 is held in the inner hole 54 of the cavity mold 52, it is necessary that the end portions P of the cutter mark 29 after depressed and deformed are positioned on the inside of the outer circumferential portion 55b of the cylindrical portion on the distal end side of the core 55 in the radial direction. It is necessary that the cutter mark 29 is depressed by being held by the protruding portions 32 and 33 in a manner that the depressed amount δ of the end portions P of the cutter mark 29 exceeds a difference Δr between the radius of the inner hole 54 and the radius of the cylindrical portion of the core 55 on the distal end side thereof. When the metal mold 51 moves along the rotary track 20 shown in FIG. 2 as in this embodiment, the molten resin 9 tends to move toward the outer side of rotation due to the centrifugal force. To prevent this, the depressing amount δ of the end portion P of the cutter mark 29 on at least the outer side of the rotary track 20 of the metal mold (P on the left side which is outer side of the center of rotation in FIG. 6, or on the right side (holder 23 side) in FIG. 4, compare with reference also to FIG. 2) must be in excess of the difference Δr between the radius of the inner hole 54 and the radius of the cylindrical portion of the core 55 on the distal end side thereof. Upon depressing the cutter mark 29 by being held by the protruded portions 32 and 33 the end portions P of the cutter mark 29 are reliably positioned on the inside of the outer diameter of the core 55 in the radial direction despite the molten resin 9 is tilted outwards due to the centrifugal force after it is fed and held in the inner hole 54 of the cavity 52 that rotates along the rotary track 20. After being depressed, further, a maximum width of the cutter mark 29 (equal to the distance between both end portions P in this embodiment) must be narrower than the outer diameter of the outer circumferential portion 55b of the core 55. According to this embodiment as described above, however, the cutter mark 29 has been contracted by the protruded portions 32 and 33 by nearly an equal width from both sides thereof. Therefore, the maximum width of the cutter mark 29 is by itself depressed to be narrower than the outer diameter of the outer circumferential portion 55b of the core 55.

To effect the depressing operation, the distance between the ends of the protruded portions 32 and 33 of the holders 22 and 23 in the closed state should be set to be smaller than the diameter of the cylindrical portion at the distal end of the core 55. Due to this setting, a maximum width of the cutter mark by itself becomes narrower than the diameter of the cylindrical portion at the distal end of the core 55 at the time when the cutter mark 29 is depressed by the protruded portions 32 and 33 while holding the molten resin 9 by closing the holders 22 and 23. In this embodiment in which the cutter mark 29 is contracted from both sides thereof by nearly an equal with, further, the above setting by itself causes the depressing amount δ to be larger than the above difference Δr.

Depending upon the temperature of the molten resin 9, further, it is probable that the cutter mark 29 that is depressed by the protruded portions 32 and 33 may expand again due to the elastic restoration. Therefore, the cutter mark may be depressed in an excess amount by taking this probability into account. Depressing in an excess amount is also effective in confining the cutter mark 29 in a narrow region at the end of the core 55.

Referring next to FIG. 5C, the neck halves 53 move down and are arranged on the cavity mold 52. Thereafter, the core 55 moves down so as to be inserted in the through hole 53a in the neck halves 53 and in the inner hole 54. At this moment, the molten resin 9 has its both end portions P of the cutter mark 29 after deformed positioned on the inside of the cylindrical portion at the distal end side of the core 55. The angular traces of the cutter mark 29 are stuck and fixed to the end of the core 55, so that the angular traces do not protrude up to the outer circumferential portion and are not extended like longitudinal traces. Therefore, the preform can be compression-formed without expressing longitudinal traces on the side wall on the inner surface side of the preform. As shown in FIG. 5D, therefore, a gap is formed having the same shape as that of the preform 27 that is to be formed, and the molten resin 9 fills the inner hole 54 and the gap on the side of the neck halves 53; i.e., the molten resin 9 is compressed onto the core 55 to form the preform 27.

After having been formed, the preform 27, while being cooled, approaches a circular track of a grip 35 of the outlet wheel 6 as shown in FIG. 1 accompanying the motion of the cavity mold 52. Thereafter, the neck halves 53 and the core 55 move up while holding the preform 27, and the preform 27 is pulled out of the cavity mold 52, is transferred onto the take-out conveyer 7, and is conveyed to a next step.

In this embodiment, as described above, to hold the molten resin 9 by the holders 22 and 23, the protruding portions 32 and 33 are formed on the inner circumferential surfaces of the holders 22 and 23. Namely, the protruding portions 32 and 33 work to shorten the length of the cutter mark 29 and to deform angular traces of nearly a right angle to the direction in which the molten resin is cut into an obtuse angle as in this embodiment. Therefore, the angular traces at the time of forming the preform 27 are depressed and eliminated by the bottom portion of the core 55 or stay in the bottom portion of the core 55 so will not to be formed in the preform 27 along the side wall thereof. Therefore, the productivity of the preforms 27 and PET bottles can be improved.

Though the invention was described above by way of the embodiment, it should be noted that the invention can be further modified or altered in various ways based on the technical idea of the invention, as a matter of course.

Figure 7:
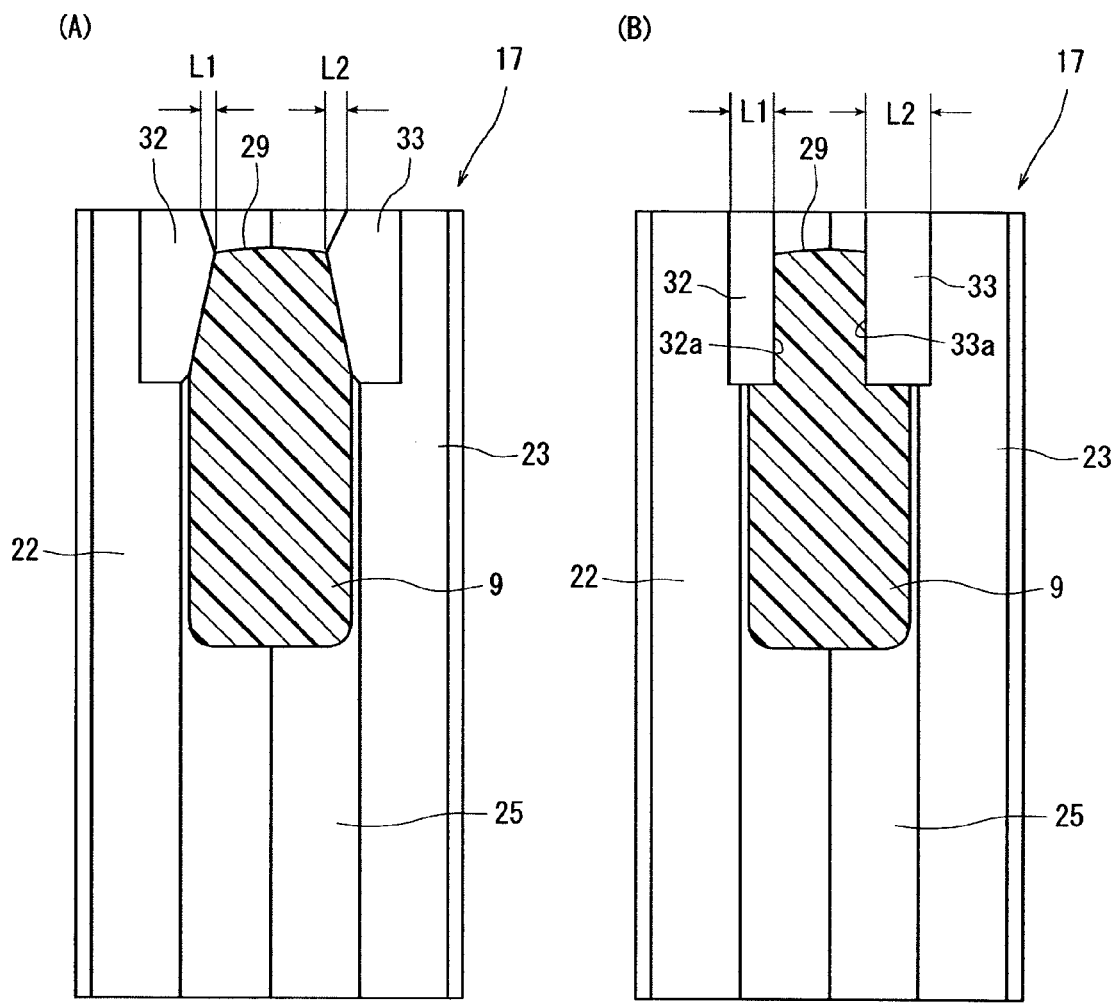
FIG. 7 illustrates holders of the apparatus for feeding resin according to a modified embodiment of the invention, wherein A is a sectional view in which protruding portions of a pair of holders have different heights of protrusion, and B is a sectional view where a vertical cylindrical surface is formed in place of a tilted surface.
Figure 8:
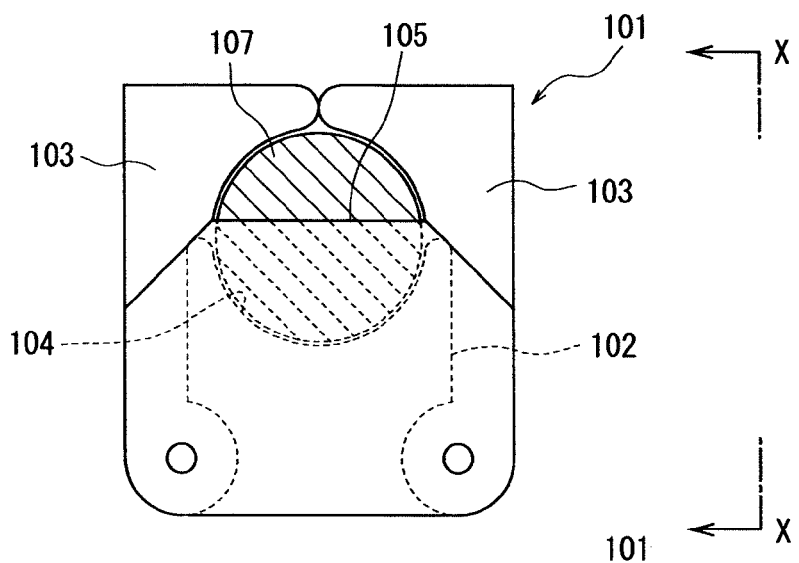
FIG. 8 illustrates conventional holders, wherein A is a plan view of when the holders are closed, B is a plan view of when the holders are opened, and C is a side view in the direction of line X-X in A.
Figure 8:
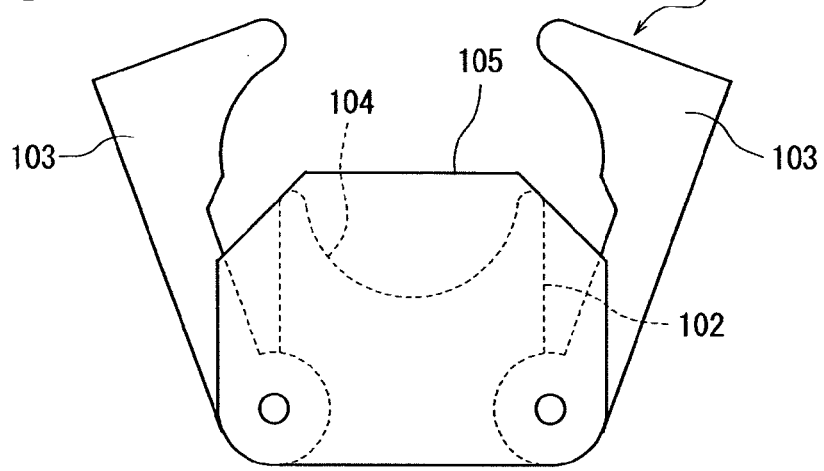
Figure 8:
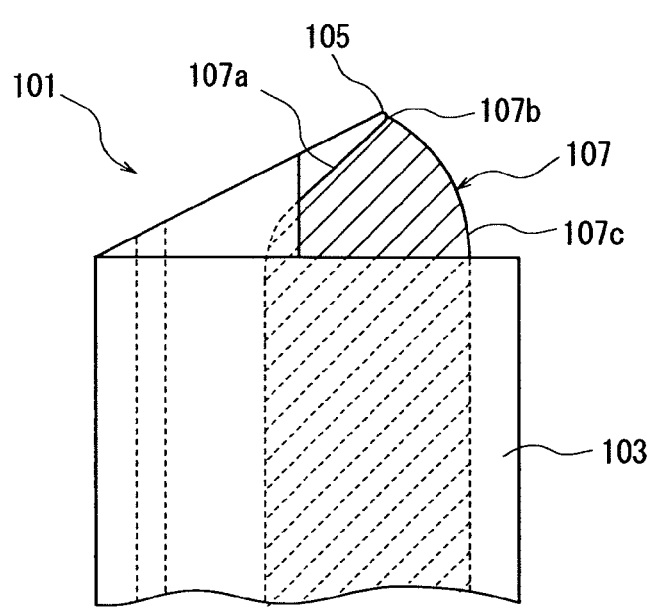
Figure 9:
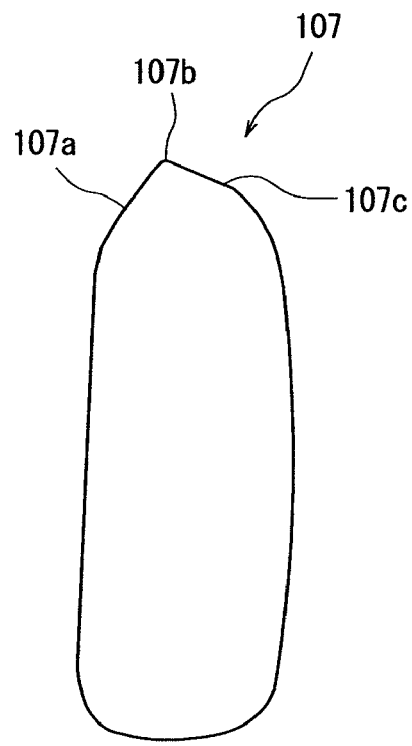
FIG. 9A is a side view of a molten resin of when a cutter mark of the molten resin cut by a cutter is viewed from a direction at right angles with the direction of cutting, and B is a front view of the molten resin of when the cutter mark is viewed from the direction of cutting.
Figure 9:
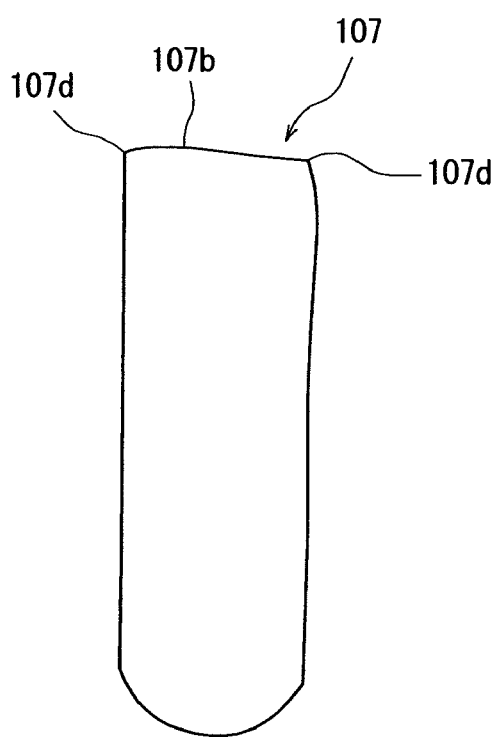
Figure 10:
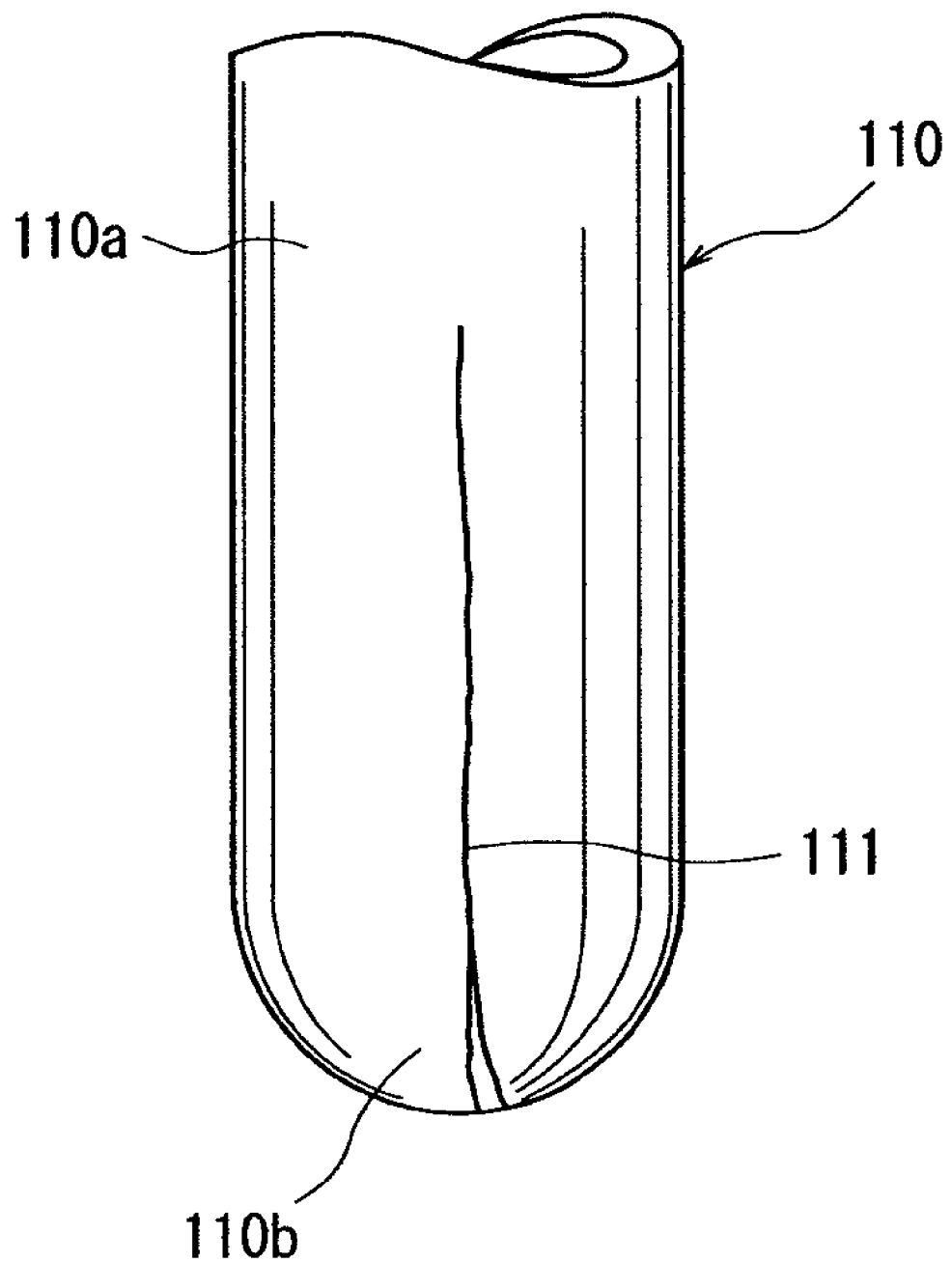
FIG. 10 is a front view of a preform formed by a conventional method and shows longitudinal traces in the preform.

FIG. 7 illustrates a modified example of holders in the apparatus for feeding resin of the present invention, wherein the holding unit 17 has the holes 22 and 23. Here, the protruding portion 32 of the holder 22 positioned on the outer side of the rotary plate 12 (see FIG. 2) in the radial direction has a length L1 of protrusion which is smaller than a length L2 of protrusion of the protruding portion 33 of the holder 23 positioned on the inner side in the radial direction.

The molten resin 9 fed into the inner hole 54 from the holding unit 17 may often undergo a complex motion of a combination of a rotary motion and a swinging motion at the time of being handed over to the cavity mold 52, or the compression-molding apparatus may often be operated at a higher speed. Further, the molten resin 9 may often be deformed being entirely deviated to one side of the inner hole to an excess degree or being tilted to an excess degree at the time of being held in the inner hole 54 of the cavity mold 52. In such a case as shown in FIG. 7, the protruded portion on one side is increased and the protruded portion on the other side is decreased or is omitted. Therefore, the cutter mark 29 is not depressed to an excess degree and the molten resin 9 is not abnormally deformed; i.e., the preform can be formed suppressing longitudinal traces. Even when the protruded portion on one side is increased, the distance between both ends of the cutter mark or the maximum width thereof is depressed by an mount in excess of 2×Δr.

The range of height for depressing the molten resin 9 to depress the cutter mark 29 is selected to be not more than ¾ the whole height of the molten resin 9 from the upper end of the molten resin 9. In this case, the molten resin 9 that is fed into the inner hole 54 of the cavity mold 52 is not tilted excessively, and the ends P of the cutter mark 29 do not protrude beyond the outer diameter of the outer circumferential portion 55b of the core 55 and do not come in contact with the inner hole 54.

The distal end of the core 55 is not limited to the semispherical shape only but may be, for example, a conical shape or a flat shape. Further, the core 55 possessed a cylindrical body portion. The core 55, however, may assume an elliptic cylindrical shape or a polygonal cylindrical shape provided it has parallel side walls in the direction of compression-formation near the distal end of the male mold.

In the above embodiment, tilted surfaces 32a and 33a were formed on the protruded portions 32 and 33, and the cutter mark 29 was deformed by the tilted surfaces 32a and 33a. However, the protruded portions may have any other shape such as a vertical cylindrical surface (FIG. 7B) or a curved surface in cross section provided the length of the cutter mark 29 can be shortened.

The arrangement of the protruded portions may be suitably changed even when the cutter mark 29 is tilted in the radial direction of rotation of the holding unit or is of a curved shape, so that the cutter mark 29 is depressed so as to be confined within the outer diameter of the outer circumferential portion 55b of the core 55.

The cutter 28 may not be provided on the holding unit 17 but may be separately provided, for example, under the die head 10 of the extruder 2.

To depress the cutter mark, the holders may be provided at least in a pair or may be provided in many number of three or more. The ends of the cutter mark may be suitably deformed toward the inside of the cutter mark by using a number of holders.

The apparatus and method of putting the invention into practice are not limited to those in which the holding units 17 and the metal molds are continuously rotating in many number, but may be the one in which they are used each in a number of one or the one of the linearly conveying type.

The invention claimed is:

1. An apparatus for feeding molten resin comprising:
a holding unit that moves on a track, at least a pair of holders capable of holding and releasing the molten resin accompanying the opening and closing of said holding unit, and a base portion for supporting said holders so as to be opened and closed and for holding the molten resin together with said holders;
wherein the molten resin discharged from an extrusion-forming machine and cut by a cutter is held by said holding unit, and is fed from said holding unit to a female mold of a compression-molding machine;
wherein at the time of cutting said molten resin, a cutter mark is formed by said cutter on a cut surface of the molten resin;
wherein a protruded portion is formed on an inner circumferential surface of at least one holder of said pair of holders to deform the end portions of said cutter mark toward the inside of the cutter mark at the time when said molten resin is held by said holding unit;
wherein at the time of holding said molten resin by said holding unit, a distance between said protruded portion and another protruded portion or the inner circumferential surface of the holder holding said molten resin, is set to be narrower than a diameter of a distal end portion of a male mold of said compression-molding machine,
wherein a protruding length of said protruded portion is formed to be larger than the difference between the radius of the inner hole of said female mold and the radius of the distal end portion of the male mold of said compression-molding machine, and the cutter mark of said molten resin is deformed toward the inside of said cutter mark.

2. The apparatus for feeding molten resin according to claim 1, wherein said pair of holders are opened and closed in the direction of cutter mark of said molten resin.

3. The apparatus for feeding molten resin according to claim 1, wherein a protruded portion of one holder of said pair of holders each forming the protruded portion is protruded toward the inside of said cutter mark more than the protruded portion of the other holder.

4. The apparatus for feeding molten resin according to claim 2, wherein said holding unit moves along a rotary track, said cutter is mounted on said holding unit, the blade of said cutter is arranged in parallel with the radial direction of the rotary track of said holding unit, and wherein of the pair of holders that opens and closes in the direction of cutter mark of said molten resin, one of said pair of holders is arranged on the outer side of said holding unit in the radial direction of rotation thereof, and the other one of said pair of holders is arranged on the inner side in the radial direction of rotation thereof.

5. An apparatus for feeding molten resin comprising:
a holding unit comprising a pair of holders and a base portion for supporting said holders so as to be opened and closed and for holding the molten resin together with said holders;
each holder of the pair of holders having an inward facing protruding portion;
the holding unit being capable of holding and releasing molten resin such that portions of the molten resin are arranged on opposite sides of an imaginary line connecting the inwardly facing protruding portions;
said molten resin is discharged from an extrusion-forming machine and cut by a cutter while being held by said holding unit, and is fed from said holding unit to a female mold of a compression-molding machine;
wherein at the time of cutting said molten resin, a cutter mark is formed by said cutter on the molten resin such that the molten resin arranged in the holding unit exhibits the cutter mark; and
wherein the cutter mark is oriented parallel to an opening and closing direction of the pair of holders and each end of the cutter mark is arranged adjacent one of the inwardly facing protruding portions.

* * * * *